United States Patent
Hu

(10) Patent No.: US 7,641,014 B2
(45) Date of Patent: Jan. 5, 2010

(54) TRACTION CONTROL SYSTEM AND METHOD

(75) Inventor: Jiamu Hu, Rochester Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 534 days.

(21) Appl. No.: 11/344,294

(22) Filed: Jan. 31, 2006

(65) Prior Publication Data

US 2007/0193802 A1    Aug. 23, 2007

(51) Int. Cl.
    *B60K 28/16* (2006.01)
(52) U.S. Cl. .................................... 180/197
(58) Field of Classification Search ................ 180/197
    See application file for complete search history.

(56) References Cited

U.S. PATENT DOCUMENTS

| | | | |
|---|---|---|---|
| 4,754,834 A | | 7/1988 | Ozaki et al. |
| 4,809,183 A | | 2/1989 | Eckert |
| 5,041,978 A | * | 8/1991 | Nakayama et al. ............ 701/84 |
| 5,137,105 A | | 8/1992 | Suzuki et al. |
| 5,245,542 A | * | 9/1993 | Itoh et al. ..................... 701/90 |
| 5,259,476 A | | 11/1993 | Matsuno et al. |
| 5,272,635 A | * | 12/1993 | Nakayama ..................... 701/89 |
| 5,330,027 A | * | 7/1994 | Glover ........................ 180/197 |
| 5,346,032 A | * | 9/1994 | Sasaki ......................... 180/233 |
| 5,417,298 A | | 5/1995 | Shibahata |
| 5,443,307 A | | 8/1995 | Maier |
| 5,448,478 A | * | 9/1995 | Eto ............................... 701/69 |
| 5,458,212 A | * | 10/1995 | Nishihara et al. ........... 180/197 |
| 5,463,551 A | | 10/1995 | Milunas |
| 5,471,386 A | | 11/1995 | Hrovat et al. |
| 5,539,643 A | | 7/1996 | Yamamoto et al. |
| 5,682,316 A | * | 10/1997 | Hrovat et al. ................. 701/84 |
| 5,717,591 A | * | 2/1998 | Okada et al. ................. 701/82 |

(Continued)

FOREIGN PATENT DOCUMENTS

DE    10209884 A1    3/2003

(Continued)

OTHER PUBLICATIONS

Direct Yaw Control System Improving Automotive Dynamic Performance; Press Information; May 29, 1996; pp. 1-14; Public Relation Division Honda Motor Col, Ltd.

(Continued)

*Primary Examiner*—Lesley D Morris
*Assistant Examiner*—Michael R Stabley
(74) *Attorney, Agent, or Firm*—Michael Best & Friedrich LLP

(57) ABSTRACT

A method and system of controlling the traction of a vehicle having at least a front axle and a rear axle. One method includes determining a stability status of the vehicle, identifying a driving style of a driver of the vehicle, generating a first drive slip target, generating a second drive slip target, determining an engine torque produced by an engine of the vehicle, determining whether the engine torque is sufficient to support an application of the first and second drive slip targets, and generating at least one torque signal. The at least one torque signal is configured to alter an amount of torque that is applied to the front and rear axles of the vehicle according to the first and second drive slip targets, respectively.

26 Claims, 5 Drawing Sheets

U.S. PATENT DOCUMENTS

| | | | | |
|---|---|---|---|---|
| 5,740,877 | A | 4/1998 | Sasaki | |
| 5,742,917 | A * | 4/1998 | Matsuno | 701/69 |
| 5,826,209 | A * | 10/1998 | Matsuno | 701/69 |
| 5,862,503 | A | 1/1999 | Eckert et al. | |
| 5,867,803 | A | 2/1999 | Kim et al. | |
| 5,899,952 | A * | 5/1999 | Fukada | 701/74 |
| 5,925,083 | A | 7/1999 | Ackermann | |
| 6,023,650 | A * | 2/2000 | Yamamoto et al. | 701/82 |
| 6,064,930 | A | 5/2000 | Shibahata | |
| 6,131,054 | A | 10/2000 | Shibahata | |
| 6,186,258 | B1 | 2/2001 | Deutschel et al. | |
| 6,195,606 | B1 | 2/2001 | Barta et al. | |
| 6,270,172 | B1 | 8/2001 | Shirai et al. | |
| 6,308,126 | B2 | 10/2001 | Yokoyama et al. | |
| 6,317,666 | B1 * | 11/2001 | List et al. | 701/29 |
| 6,334,656 | B1 | 1/2002 | Furukawa et al. | |
| 6,366,844 | B1 | 4/2002 | Woywod et al. | |
| 6,397,152 | B1 | 5/2002 | Kalweit et al. | |
| 6,409,286 | B1 | 6/2002 | Fennel | |
| 6,539,298 | B2 * | 3/2003 | Inagaki et al. | 701/70 |
| 6,564,138 | B1 | 5/2003 | Schmitt et al. | |
| 6,584,399 | B2 * | 6/2003 | Koibuchi | 701/90 |
| 6,615,126 | B1 * | 9/2003 | Potter et al. | 701/84 |
| 6,663,536 | B1 | 12/2003 | Meier | |
| 6,681,168 | B2 | 1/2004 | Plzin | |
| 6,694,227 | B2 | 2/2004 | Nowottnick et al. | |
| 6,697,728 | B2 * | 2/2004 | Kin et al. | 701/70 |
| 6,704,622 | B2 | 3/2004 | Tinskey et al. | |
| 6,705,685 | B1 | 3/2004 | Halat et al. | |
| 6,718,249 | B2 | 4/2004 | Herb et al. | |
| 6,755,488 | B2 * | 6/2004 | Fawkes et al. | 303/139 |
| 6,810,317 | B2 | 10/2004 | Sauter et al. | |
| 6,816,764 | B2 | 11/2004 | Coelingh et al. | |
| 7,122,979 | B2 * | 10/2006 | Wilton et al. | 318/400.09 |
| 2002/0153770 | A1 | 10/2002 | Matsuno et al. | |
| 2003/0036839 | A1 | 2/2003 | Han et al. | |
| 2003/0191572 | A1 | 10/2003 | Roll et al. | |
| 2003/0225495 | A1 | 12/2003 | Coelingh et al. | |
| 2003/0225496 | A1 | 12/2003 | Coelingh et al. | |
| 2004/0059494 | A1 * | 3/2004 | Yoneda | 701/89 |
| 2004/0176899 | A1 * | 9/2004 | Hallowell | 701/84 |
| 2004/0256913 | A1 | 12/2004 | Schmidt et al. | |
| 2005/0004738 | A1 * | 1/2005 | Gronau et al. | 701/70 |
| 2005/0012386 | A1 * | 1/2005 | Nakano et al. | 303/114.1 |
| 2005/0029862 | A1 | 2/2005 | Kato et al. | |

FOREIGN PATENT DOCUMENTS

| | | |
|---|---|---|
| EP | 0922618 A2 | 6/1999 |
| JP | 4103436 A | 4/1992 |

OTHER PUBLICATIONS

Larry Webster; Why Do These Similar Cars Feel So Different?; Car and Driver; Feb. 2005; pp. 70-71.

* cited by examiner

TRACTION CONTROL SYSTEM AND METHOD

BACKGROUND

Modern four-wheel or all-wheel drive vehicles have been developed to give vehicle operators greater traction over varied terrain. Often, all-wheel drive vehicles use an electronically controlled system to affect the way in which the vehicle responds to certain terrain conditions. For example, electronic sensing units are used to indicate vehicle speed and acceleration. Such sensing units provide signals to a control unit, which can alter how braking is applied to the wheels in order to maintain traction with the road surface.

SUMMARY

Although traction control systems are known, they are not fully satisfactory. For example, many systems do not individually manipulate torque to each drive wheel. In addition, many do not use integrated control of engine, braking, and drivetrain systems. Furthermore, a typical traction control system can be overly aggressive in reducing engine torque. It may be desirable to have a traction control system that in one mode provides enhanced stability, but in another mode allows a driver to purposely skid or slide the vehicle in a controlled fashion, for example, in the manner in which rally drivers or so-called "drifters" do in competition.

One embodiment of the invention provides a method of controlling the traction of a vehicle having at least a front axle and a rear axle. The method includes determining a stability status of the vehicle, identifying a driving style of a driver of the vehicle, generating a first drive slip target for one driven axle, generating a second drive slip target for the other driven axle, determining an engine torque produced by an engine of the vehicle, determining whether the engine torque is sufficient to support an application of the first and second drive slip targets, and applying a first torque and a second torque to the front and rear axles of the vehicle, respectively. The first and second torques are distributed to the front and rear axles according to the first and second drive slip targets, respectively.

In another embodiment, a traction control system includes a controller configured to generate a first drive slip target between two wheels for one drive axle, a second drive slip target between two wheels for another driven axle. The first and second drive slip targets are generated according to loading condition of each wheel and an estimation of a skill level of the driver of the vehicle. The output signals are indicative of independent torque quantities to be applied to individual wheels of the front and rear axles of a vehicle during turning.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
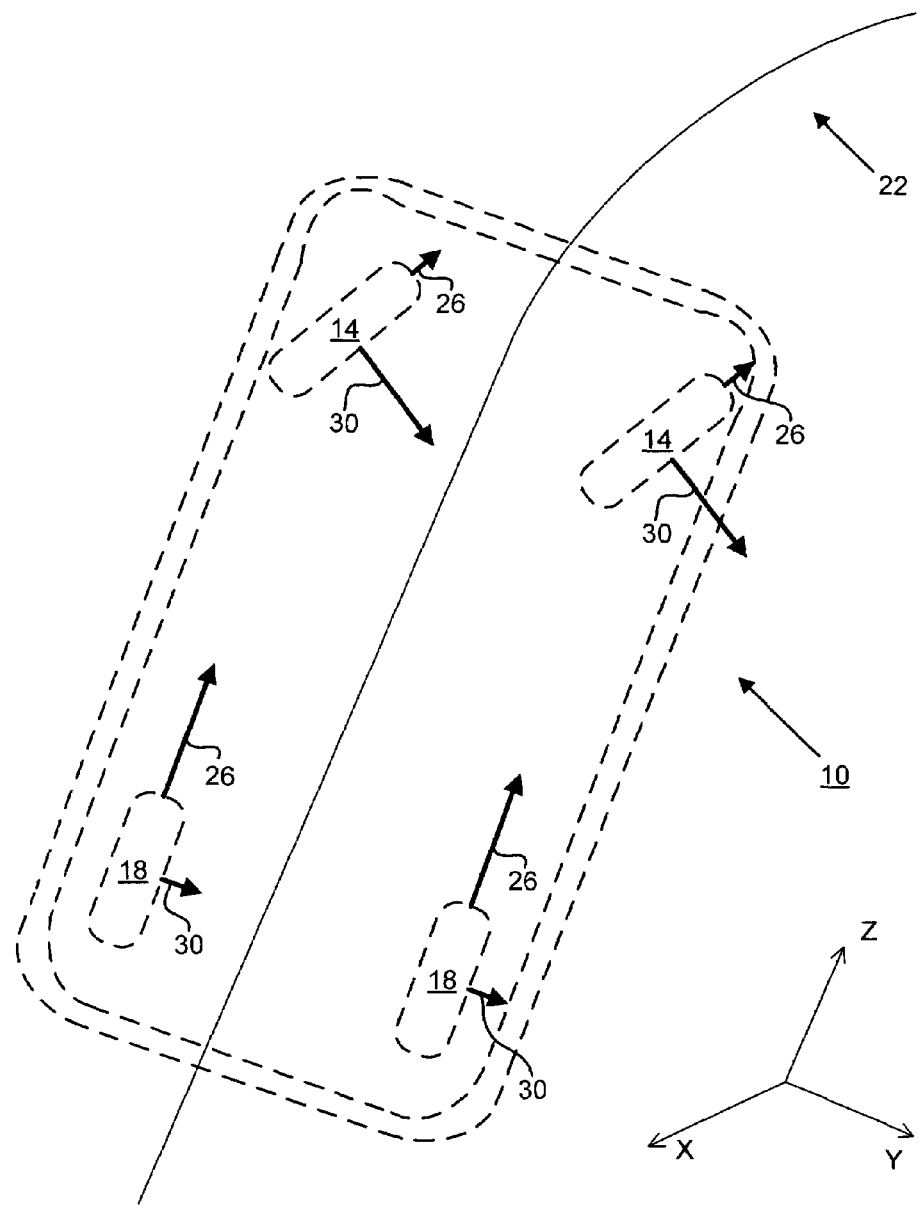
FIG. 1 illustrates an exemplary embodiment of a vehicle.

FIG. 1 illustrates a vehicle 10 having front wheels 14 and rear wheels 18. The vehicle 10 is following a curved vehicle path 22 and illustrated with respect to an XYZ axis. As the vehicle 10 follows the path 22, the wheels 14 and 18 have a certain drive slip (represented by arrows 26) and a certain lateral turning capability (represented by arrows 30).

Drive slip (or wheel slip) can be used to describe an amount of slip that the wheels of a vehicle are allowed with respect to a driving surface. Generally, drive slip is related to the amount of torque, or twisting force, that is applied to the wheels 14 and 18 of the vehicle 10. For example, an amount of torque can be applied to the wheels of a vehicle to make them begin to slip. This slipping becomes more pronounced on driving surfaces with a lower surface coefficient of friction. As a result, a driving surface having a low surface coefficient of friction (e.g., gravel, loose dirt, snow, etc.), requires less torque to cause drive slip.

Drive slip has an impact on the lateral capability of a vehicle (i.e., the vehicle's ability to turn). Generally, as drive slip is increased, the lateral capability is reduced. For example, as shown in FIG. 1, decreasing the slip 26 increases the lateral capability 30. Similarly, increasing the slip 26 decreases the lateral capability 30. In the situation illustrated in FIG. 1, the front wheels 14 of the vehicle 10 have traction (i.e., are not substantially slipping), and begin to lead the vehicle through the turn 22. The rear wheels 18 of the vehicle 10 are slipping, which reduces their lateral capability 30. As a result, the front of the vehicle 10 is turning (e.g., begins to travel in the "Y" direction), while the rear of the vehicle 10 continues to travel straight (e.g., continues in the "Z" direction). As the vehicle 10 continues through the turn and the rear wheels 18 continue to slip, the rear of the vehicle 10 rotates more quickly about the "X" axis (e.g., a vertical axis extending through the vehicle 10, from the bottom to the top) than the front of the vehicle 10. Depending on the speed of the vehicle 10 and the radius of curvature of the turn (i.e., how "sharp" the turn is), the rear of the vehicle 10 rotates further than the front of the vehicle 10 (e.g., slides through the desired turn 22). This "rear-end slide" effect, which can be referred to as oversteering, can actually increase the speed at which a corner can be negotiated if properly controlled. Additionally, some driving enthusiasts enjoy the more aggressive "rally style" driving experience.

Figure 2A:
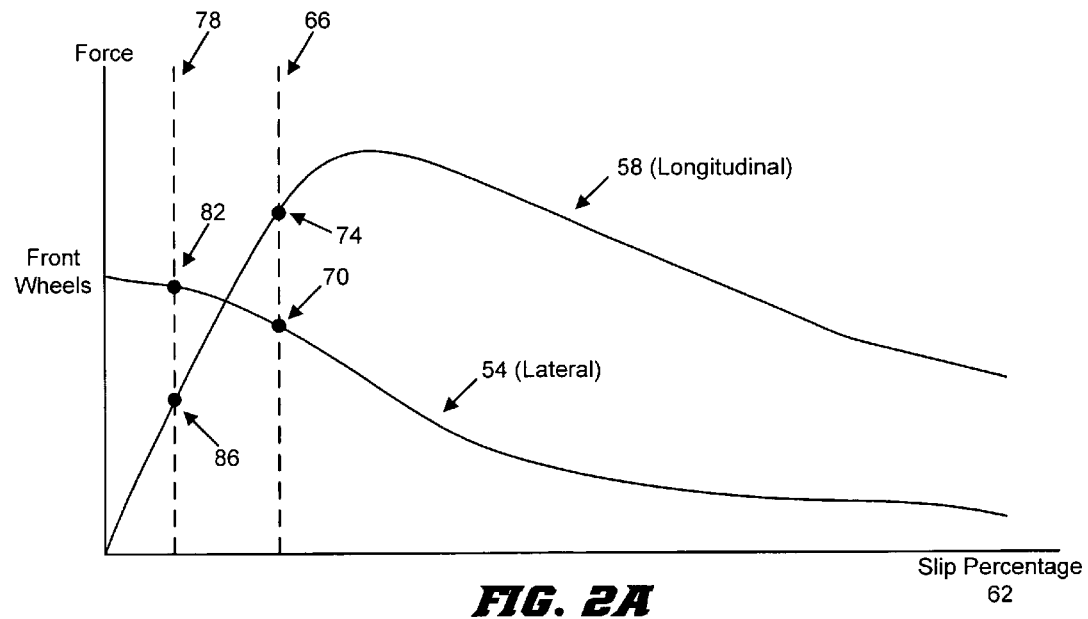
FIG. 2A illustrates an exemplary plot of drive slip versus force at a front axle of a vehicle.
Figure 2B:
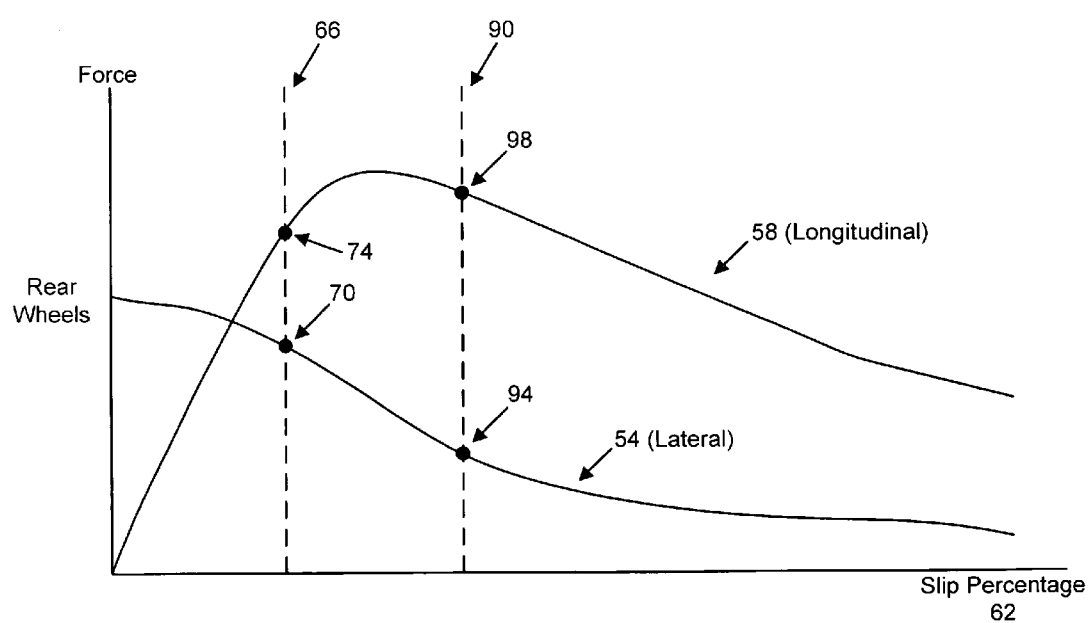
FIG. 2B illustrates an exemplary plot of drive slip versus force at a rear axle of a vehicle.

FIGS. 2A and 2B graphically illustrate the relationship between wheel forces and drive slip percentage. FIG. 2A illustrates the force/slip relationship of the front wheels 14, while FIG. 2B illustrates the force/slip relationship of the rear wheels 18. Slip, as previously described, is the amount that the wheels spin in excess of actual vehicle speed, and can be measured as a slip percentage. For example, at 50% slip the wheels 14 and 18 have about 50% more linear velocity than vehicle's velocity. For a given surface friction coefficient, the amount of slip increases when the wheel torque increases. A relatively small slip yields wheel forces that are generally proportional to the amount of torque that is applied to the axles. A larger slip causes the wheel forces to decrease, and become less proportional to the amount of torque that is applied to the axels (e.g., as a result of the spinning wheels).

FIGS. 2A and 2B include a lateral force trace 54 and a longitudinal force trace 58 for the wheels 14 and 18, respectively. The lateral and longitudinal forces shown in FIGS. 2A and 2B vary with a slip percentage 62 (at a given slip angle). By way of background, a slip angle can be described as an angular difference between the wheel heading (i.e., the direction that the wheel is pointed) and the direction of wheel travel (i.e., the direction that the wheel is moving). In the embodiment shown, the lateral force 54 generally decreases as the slip percentage 62 increases. Conversely, the longitudinal force 58 increases (for a certain period) as the slip percentage 62 increases. Then, the longitudinal force decreases. As the wheels 14 and 18 slip more and more, the lateral and the longitudinal forces 54 and 58 decrease (i.e., the wheels spin relatively freely).

During a normal turn, the forces that are applied to the front and rear wheels 14 and 18 of the vehicle 10 are approximately equal. For example, in the embodiments shown in FIGS. 2A and 2B, a normal slip target is marked by dashed line 66. The normal slip target 66 has a corresponding lateral wheel force (intersection 70) and longitudinal wheel force (intersection 74). Using approximately the same slip target for the front and rear wheels 14 and 18 can help to ensure the that vehicle 10 has sufficient traction, and the driver of the vehicle 10 has a normal, stable driving experience. However, in some embodiments, the slip targets for the front and rear wheels 14 and 18 can be individually controlled to change the traction of the vehicle 10 and the resulting driving experience. For example, in one embodiment, a controller (as described with respect to FIG. 5) can alter the slip targets for the front and rear wheels 14 and 18 independently, which changes the longitudinal and lateral forces. Changing the forces that are applied to the wheels 14 and 18 can alter the way the vehicle 10 handles (and feels) through a turn. In one embodiment, the longitudinal forces on the front wheels 14 are decreased, thereby increasing their lateral capability. Conversely, the longitudinal forces of the rear wheels 18 are increased, thereby reducing their lateral capability. As a result, the traction of the vehicle 10 is changed, destabilizing the rear (i.e., inducing an oversteering condition) and providing the driver with a more aggressive feel.

FIG. 2A illustrates one example of a front axle slip target adjustment. A new front axle slip target (marked by dashed line 78) is relatively less than the normal turn slip target 66. Therefore, in comparison, the lateral force is increased while the longitudinal force is decreased. Such a relationship, as marked by intersections 82 and 86, respectively, increases the lateral capability (or force) of the front axle of the vehicle 10. FIG. 2B illustrates an exemplary rear axle slip target adjustment (marked by dashed line 90), which is relatively greater than the normal slip target 66. In contrast to the situation illustrated in FIG. 2A, the lateral force is decreased (intersection 94) while the longitudinal force is increased (intersection 98). Such a relationship reduces the lateral capability of the rear axle of the vehicle. As described above and in connection with FIG. 1, increasing the lateral capability of the front axle, while decreasing the lateral capability of the rear axle allows the rear of the vehicle 10 to rotate more quickly than the front of the vehicle 10, producing a rally-style feel for the driver. Other slip target adjustments are also possible. For example, in other embodiments, the front and rear slip targets can be adjusted differently by changing the difference between the slip target of the front wheels and the slip target of the rear wheels.

Figure 3:
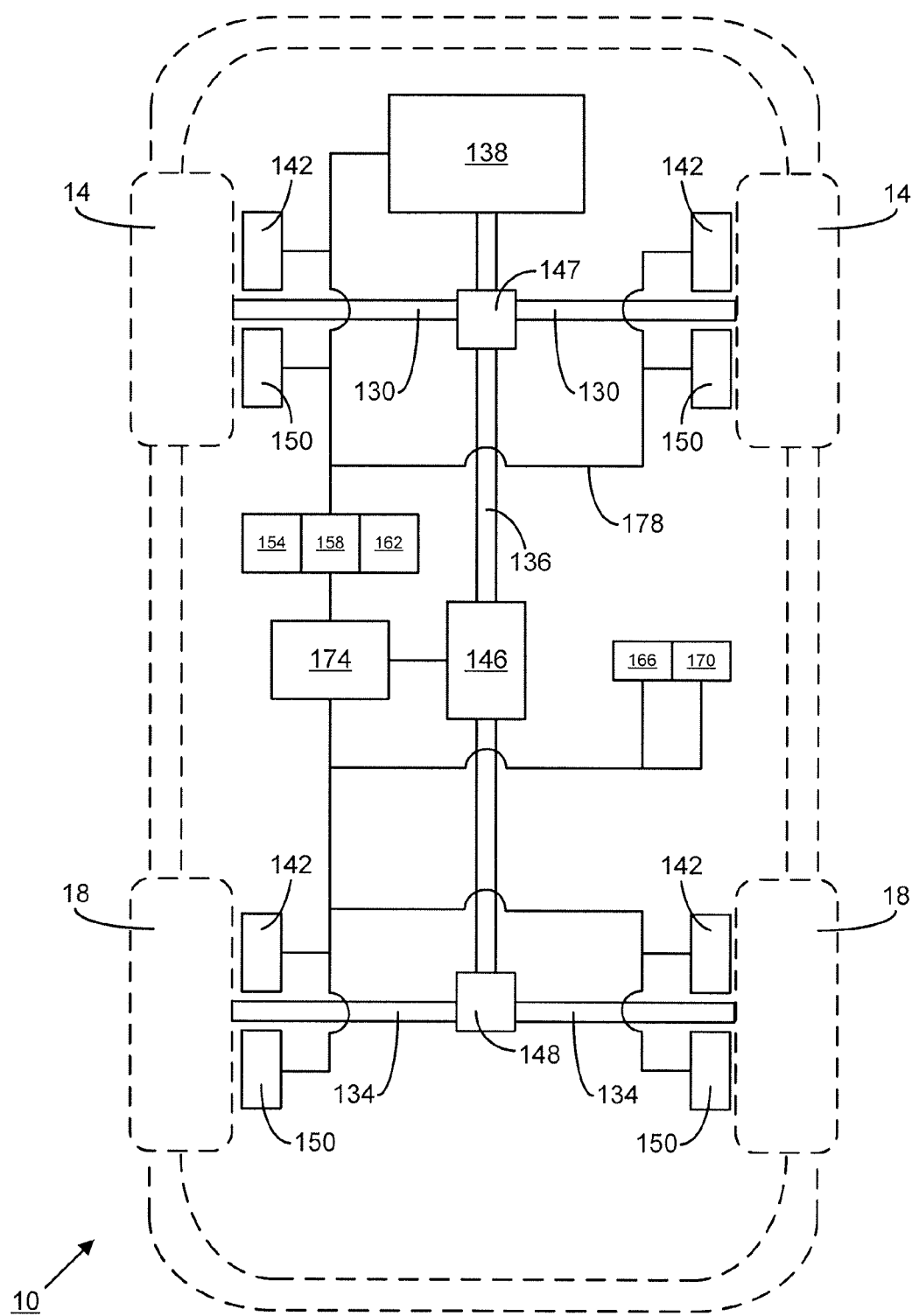
FIG. 3 illustrates an exemplary embodiment of a vehicle having a traction control system.

FIG. 3 is a schematic of the exemplary vehicle 10 having a traction control system. In one embodiment, the vehicle 10 includes mechanical components such as a front axle 130, a rear axle 134, a drive shaft 136, an engine 138, brakes 142, and a center coupling device 146. In other embodiments, the vehicle 10 can include more or fewer components. For example, the vehicle 10 can include more axles and wheels than those shown (e.g., a truck with two front wheels and four rear wheels). The vehicle can also include components such as a front differential 147 and a rear differential 148 that are coupled to the front axle 130 and rear axle 134, respectively.

The front wheels 14 and rear wheels 18 are coupled to the front axle 130 and the rear axle 134, respectively. The axles 130 and 134 are coupled to the drive shaft 136, which is turned by the engine 138. The center coupling device 146 is configured to distribute torque from the drive shaft 136 to the front and rear axles 130 and 134. In some embodiments, the center coupling device 146 is a center differential that can distribute different amounts of torque to the front and rear axles 130 and 134. For example, the front axle 130 (and therefore the front wheels 14) may receive 40 percent of the total torque that is produced by the engine 138, while the rear axle 134 (and therefore rear wheels 18) may receive the remaining 60 percent of available torque. In another embodiment, the front differential 147 and the rear differential 148 can be added to distribute varying amounts of torque to the left and right wheels of the vehicle 10. For example, the front differential can be used to distribute a different amount of torque to each of the front wheels 14. Similarly, the rear differential can be used to distribute a different amount of torque to each of the rear wheels 18. Therefore, it is possible to distribute different amounts of torque to each of the wheels 14 and 18 of the vehicle 10.

The way in which torque is distributed is limited by the configuration of the vehicle. For example, some two-wheel drive vehicles may only include a single differential, which controls either the front or rear wheels. Thus, only the wheels that are coupled to the differential may receive different amounts of torque. Other vehicles may include multiple differentials or an all-wheel drive system, which can allow different amounts of torque to be applied to each of the wheels. Additionally, the way in which the wheels 14 and 18 are driven is not limited to differentials and driven axles coupled to a central engine. For example, the front wheels 14 and rear wheels 18 of the vehicle 10 can be driven by separate electric motors (not shown). The torque that is applied to the wheels 14 and 18 of the vehicle 10, therefore, is dependent on the torque that each of the electric motors produces. Torque can also be controlled by applying a braking force to the wheels 14 and 18. Other ways of applying different amounts of torque to the wheels of the vehicle 10 should be apparent to those skilled in the art.

The brakes 142 can be used to apply a braking force to the wheels 14 and 18. In some embodiments, the braking force is distributed evenly between the front wheels 14 and the rear wheels 18, so that each of the wheels of the vehicle 10 receives approximately the same amount of braking force. Alternatively, a different amount of braking force can be applied to the wheels individually. Such an implementation may be accomplished using a brake-based electronic stability control ("ESC") system or other electronic or computer control. As a result, in one embodiment, the torque at the wheels 14 and 18 is controlled using the brakes 142, as described in greater detail below.

Some of the components of the vehicle, such as the center coupling device 146 may be electronically- or computer-controlled. For example, a coupling device or differential can comprise an electro-mechanical or electro-hydraulic controllable coupling device, which includes mechanical and hydraulic components, as well as an integrated electronic control unit ("ECU"). Therefore, in some embodiments, the ECU of the coupling device or differential is responsible for certain operations, for example, actuating a clutch within the coupling device or differential, or measuring the amount of torque that is applied to the front axle 130 and rear axle 134.

Additional components of the vehicle 10 include wheel speed sensors 150, a steering angle sensor 154, a driver input sensor 158 (e.g., a pedal sensor), a desired driving style signal generator or style indicator 162 (such as an occupant-compartment mounted button and associated electronics), a yaw rate sensor 166, an acceleration sensor 170 (e.g., accelerometer or lateral acceleration sensor), and a controller 174. In one embodiment, the controller 174 is responsible for evaluating a traction control process (described below). Certain functions of the brakes 142 and the center differential 146 may also be electronically controlled. Each of the components of the vehicle 10 can be electrically connected via a bus 178 (e.g., a controller area network ("CAN"), a local interconnect network ("LIN"), or the like). The bus 178 can be used to supply power and transfer data signals to each of the components that are connected on the system. In other embodiments, a vehicle-wide communication bus, such as the bus 172 is not required, and each of the vehicle components is connected using separate electrical connections.

Referring still to FIG. 3, the wheel speed sensors 150 transmit a signal to the controller 174 indicative of a rotational wheel speed. In some embodiments, each of the wheels includes a separate wheel speed sensor 150. In other embodiments, fewer wheel speed sensors 150 are used. Additionally or alternatively, the speed of each of the wheels may be measured in a different way, for example, by tracking the rotation of the drive shaft 136 or axles 130 and 134.

The steering angle sensor 154 transmits a signal to the controller 174 indicative of a steering angle of the vehicle 10. For example, the steering angle sensor 154 may be used to transmit a signal to the controller 174 that corresponds to an angle at which the front wheels 14 are turned. The angle at which other wheels are turned (e.g., the rear wheels 18) can also be monitored using additional steering angle sensors, if applicable. The angle of rotation of the steering wheel can be determined using relative or absolute position references. A steering wheel position, for example, that aligns the wheels 14 approximately perpendicular to the axle 130 may represent a zero degree mark. Each degree that the steering wheel is turned away from the zero degree mark can then be measured. Measuring the steering angle of the vehicle 10 with a steering wheel sensor represents only one possible method of measuring the steering angle. A sensing mechanism that is positioned further from the steering source (i.e., the steering wheel) could also be used to measure the steering angle. For example, a sensing mechanism could be used to measure the actual wheel position, and angle thereof, compared to a standard reference such as an axle.

The driver input sensor 158 transmits a signal to the controller 174 indicative of a torque or braking request by a driver. Such a request is generally followed by an acceleration or deceleration response by the vehicle 10. For example, if the driver of the vehicle 10 wishes to accelerate, an acceleration pedal (not shown) can be depressed. Conversely, if the driver of the vehicle 10 wishes to decelerate, a brake pedal (not shown) can be depressed. Accordingly, in some embodiments, the driver input sensor 158 is one or more pedal sensors that monitor the position of the accelerator and brake pedals. However, the torque and braking requests and the corresponding vehicle response can also be measured in other ways. For example, a flow rate of fuel into the engine of the vehicle 10 can be monitored. Generally, fuel flow rate can be correlated to torque. Alternatively or additionally, the position of a throttle cable may also be measured to indicate a torque request (and vehicle response). A torque or braking request signal may also be sent from the acceleration pedal or brake pedal to the engine electronically (e.g., drive-by-wire system). Other ways to monitor torque and braking requests should be apparent to those skilled in the art.

The desired driving style signal generator 162 is used to transmit a desired driving style signal to the controller 174. In some embodiments, the driver of the vehicle 10 chooses to increase a slip threshold or slip difference between the front wheels 14 and the rear wheels 18 using the desired driving style signal generator 162. As previously described, increasing the slip difference between the front and rear wheels 14 and 18 creates a more aggressive driving experience for the driver. In one embodiment, the desired driving style signal generator 162 is a pushbutton. If the driver of the vehicle 10 wishes to increase the slip difference (i.e., initiate a "rally mode") the pushbutton can be actuated. If the driver wishes to return the slip threshold to normal tolerances, the pushbutton can be actuated again. In other embodiments, the driving style signal generator 162 transmits a variable signal. Accordingly, the slip threshold can be variably adjusted, allowing the driver of the vehicle 10 greater dynamic control.

The yaw rate sensor 166 transmits a signal to the controller 174 that is indicative of a yaw rate of the vehicle. The term yaw rate is intended to describe a speed at which the vehicle 10 rotates about a vertical axis (i.e., the previously described "X" axis that extends vertically through the vehicle 10, from the bottom to the top). The accelerometer 170 transmits a signal to the controller 174 that is indicative of a lateral (i.e., side-to-side with respect to the vehicle 10) acceleration of the vehicle 10. Optionally, the accelerometer 170 could be configured to sense longitudinal acceleration as well. In some embodiments, the yaw rate sensor 166 and accelerometer 170 can be combined into a sensing module. Alternatively, the yaw rate sensor 166 and the accelerometer 170 may be separate modules that are positioned in different locations, depending on the vehicle 10 and the requirements of the sensors 166 and 170.

The controller 174 is configured to determine how much torque is distributed to the front wheels 14 and the rear wheels 18. The controller 174 also determines the amount of torque that the engine 138 is required to produce in order to satisfy the target drive slips, as described in greater detail below.

Figure 4:
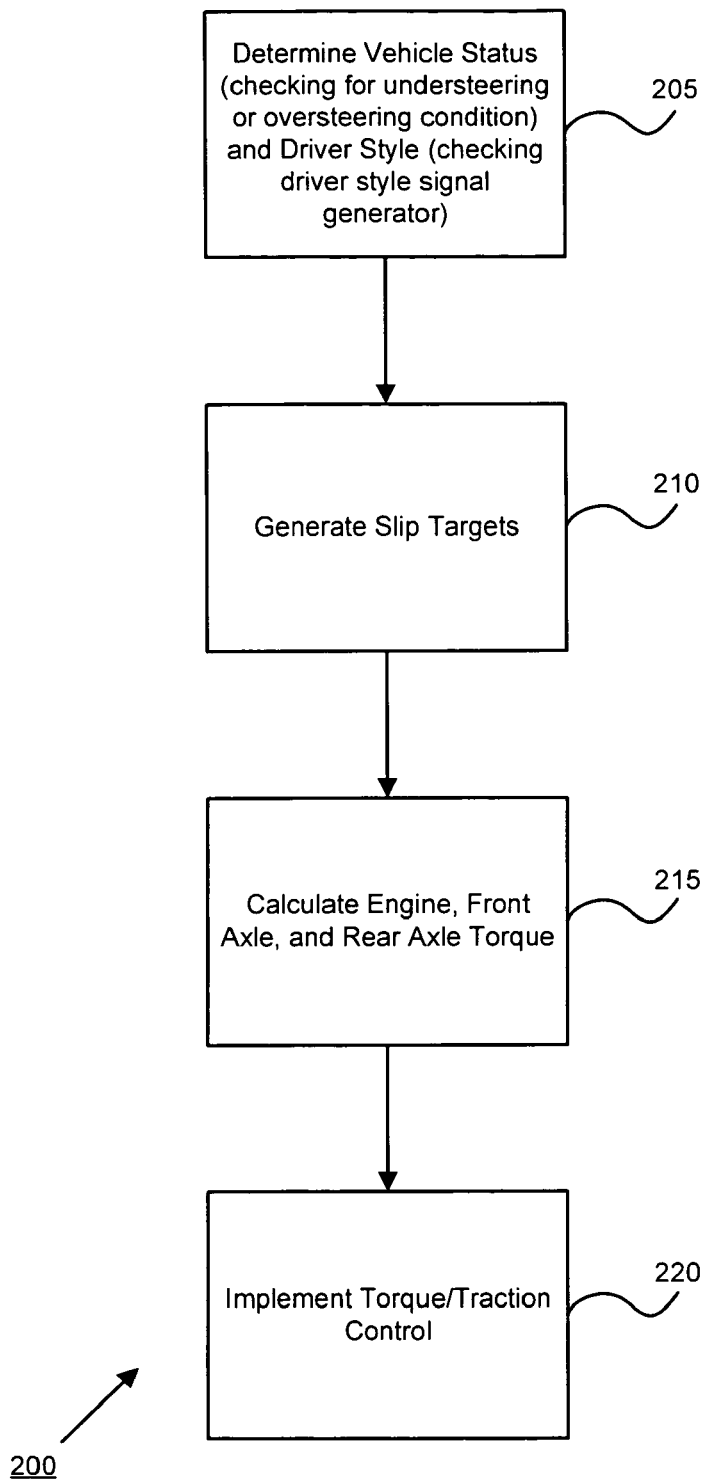
FIG. 4 illustrates a flow chart of an exemplary traction control process.

FIG. 4 illustrates a traction control process 200 that can be used to determine slip targets (see FIG. 2), and use those slip targets to alter the traction of the vehicle 10. In some embodiments, the process 200 is carried out by the controller 174. In other embodiments, certain steps of the process 200 can be carried out by other controllers (such as other controllers used in the vehicle to control engine, braking, and other systems).

The process 200 begins by determining the vehicle status and the identifying the desired driving style and the capability of the driver (step 205). After the vehicle status and the driving capabilities and desires of the driver have been determined, slip targets are generated (step 210). As described in greater detail below, the slip targets may increase or decrease the lateral capability of the axles 130 and 134 in order to deliver a vehicle traction response that is consistent with the driver's ability and desire.

Torque calculations are completed (step 215) after the slip targets are generated (step 210). Torque calculations can include calculating the amount of torque that is required to implement the slip targets generated in step 210. In some embodiments, the torque that is required to meet the slip targets for the front axle 130 is different than the torque that is required to meet the slip targets for the rear axle 135. The torque that is applied to the axles 130 and 135 of the vehicle 10 can be controlled by multiple vehicle systems. As a result, step 215 can also include determining which vehicle system is responsible for controlling the torque. For example, a total torque calculation can be required for the engine 138 of the vehicle 10, so that it produces enough torque to satisfy the torque requirements of the slip targets. Additionally, a center coupling torque calculation can be required for the center coupling device 146, so that the center coupling device 146 correctly divides the total torque between the front and rear axles 130 and 134. Alternatively or additionally, a braking torque calculation can be required for the braking system 150 of the vehicle 10, so that the breaks 142 and associated components correctly apply the brakes of the vehicle.

Torque signals are sent to the appropriate vehicle systems (e.g., an engine ECU, a center coupling device ECU, etc.) (step 220) after the torque calculations have been completed. In some embodiments, the traction control process 200 is completed at a rate that is defined by the controller 174. For example, in some embodiments, the process 200 is completed in a fraction of a second, and upon completion, the traction control process 200 is repeated. Continually repeating the process 200 helps ensure that the vehicle's traction is continually controlled in accordance with the skill and desires of the driver. As a result, the slip target calculations (step 210), the corresponding torque calculations (step 215), and the resulting traction control implementation (step 220) can be completed and changed several times during a vehicle maneuver (e.g., a turn).

Figure 5:
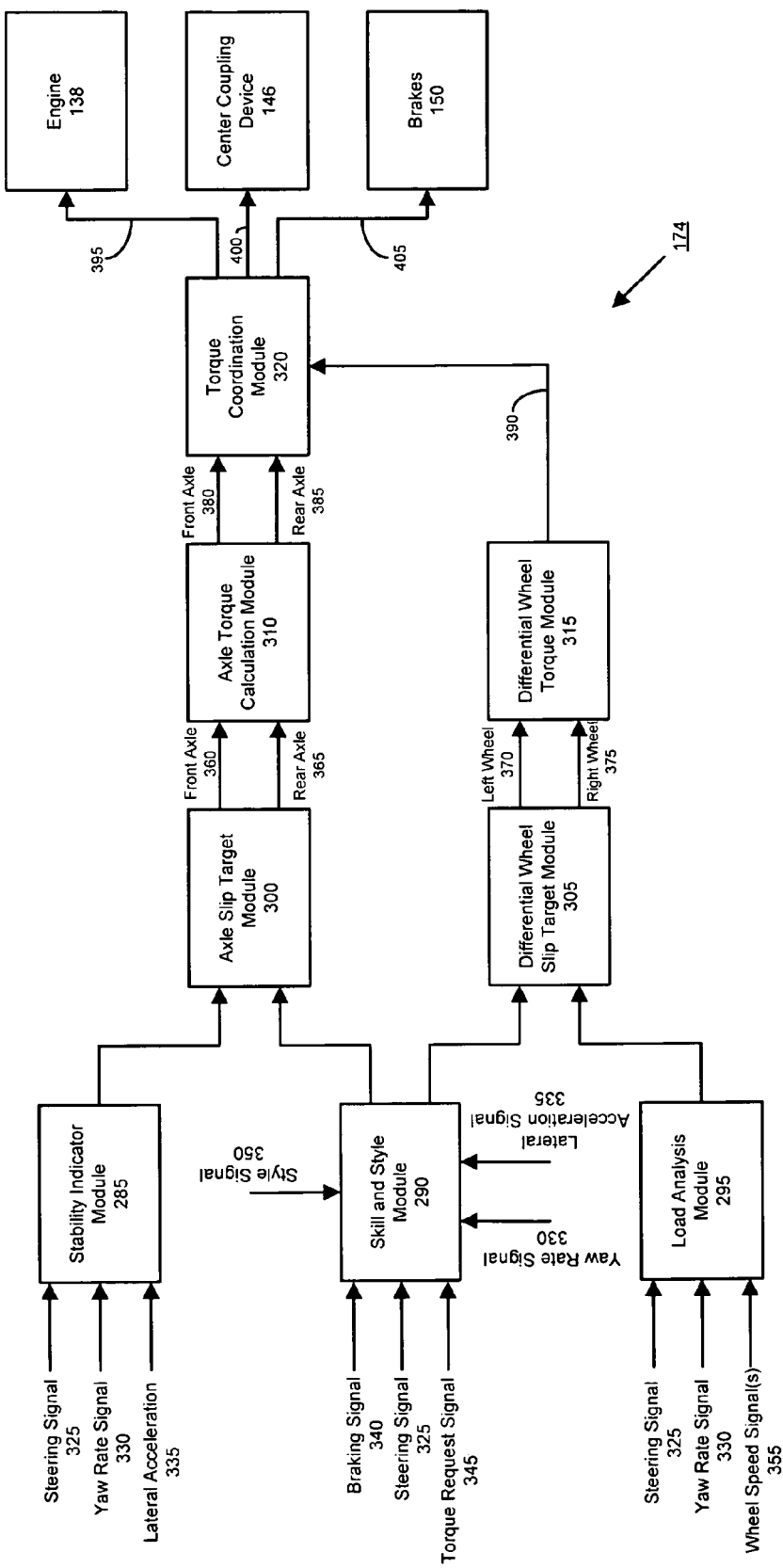
FIG. 5 illustrates a schematic of an exemplary traction control system controller.

FIG. 5 illustrates one embodiment of the controller 174, which can be used to complete the process 200. In the embodiment shown, the controller 174 includes a stability indicator module 285, a skill and style module 290, and a load analysis module 295. The calculations from the stability indicator module 285 are used by an axle slip target module 300. The calculations from the load analysis module 295 are used by a differential wheel slip target module 305. The calculations from the skill and style module 290 are used by both the axle slip target module 300 and the differential wheel slip target module 305. An axle torque calculation module 310 receives the calculations from the axle slip target module 300, while a differential wheel torque target module 315 receives the calculations from the differential wheel slip target module 305. A torque coordination module 320 receives the calculations from the axle torque calculation module 310 and the differential wheel torque target module 315, and transmits torque actuation signals to the engine 138, the center coupling device 146, and the brakes 150. Each of the modules is described separately in greater detail below to provide a system level representation of the processes controller.

It should be understood that with the exception of the axle slip target module 300, many of the processes carried out by the modules shown in FIG. 5 are generally known in the art. For example, there are known algorithms that can be used to determine the stability of a vehicle and that might be used in the vehicle stability module 285. The processes carried out by the axle slip target module 300 include those that have been described with respect to FIGS. 1-4.

The vehicle stability module 285 utilizes a steering signal 325, a yaw rate signal 330, and a lateral acceleration signal 335 to provide a vehicle status indication (step 205 in FIG. 4). For example, in one embodiment, the stability indicator module 285 can determine the presence of an understeering or oversteering condition. An understeering condition exists when the wheels of a vehicle are turned, but the vehicle does not follow the intended turning path and proceeds to travel forward instead of at the intended turning radius (i.e., the turning radius corresponding to the angle of the wheels). An oversteering condition exists when the wheels of the vehicle are turned to a certain angle, but the vehicle does not follow the corresponding turning radius and proceeds to turn too sharply.

The skill and style module 290 determines the ability and style of the driver of the vehicle 10 (step 205) using a brake pressure signal 340, the steering signal 325, an accelerator or torque request signal 345, the yaw rate signal 330, and the lateral acceleration signal 335. For example, the brake pressure signal 340 can be used to determine the pressure and duration that the brakes 142 are applied. Braking in short, choppy, or inconsistent motions can indicate an unskilled driver. Alternatively, firm and steady brake applications can indicate a skilled driver. The accelerator signal 345 can also be used to determine driver skill. For example, applying the accelerator erratically or inconsistently can also indicate an unskilled driver, while steady and consistent acceleration can indicate a skilled driver. Additionally, the steering signal 325 can be used to indicate the skill level of the driver. For example, if the driver repeatedly steers excessively at the beginning of a turn, and must correlatively steer a large amount later in the turn (i.e., the steering wheel was turned more than the required amount), it may be determined that the driver is not very skilled. Other estimations of driver skill could also be made. The skill and style module 290 also determines a desired driving style of the driver (e.g., normal, rally, etc.) with the assistance of a style signal 350 (e.g., from the desired driving style signal generator 162), which provides a readily available indication of the desired driving style of the driver.

The load analysis module 295 calculates the load on each of the wheels (also completed during the vehicle status and driving style step 205 in FIG. 4) using the steering signal 325, the yaw rate signal 330, and wheel speed signal(s) 355. A "wheel load" refers to forces (e.g., radial, axial, torsional, etc.) that are imposed on the wheel. These loads (i.e., forces) can change throughout a turn. For example, the wheels on the outside of the vehicle generally experience higher loading than the wheels on the inside of the vehicle. The loading characteristics have an affect on the performance and capabilities of the vehicle 10. As a result, the wheel loading calculations from the load analysis module 295 can be used to calculate a differential wheel slip target, as described in greater detail below.

The axle slip target module 300 uses the calculations from the stability indicator module 285 and the skill and style module 290 to generate a front axle slip target 360 and a rear axle slip target 365. More specifically, the axle slip target module 300 can determine the current status of the vehicle 10, the skill level of the driver, and how much the driver is willing to allow the vehicle to destabilize (e.g., the amount of "rally" style driving desired) to generate the front axle slip target 360 and the rear axle slip target 365. If the stability indicator module 285 indicates that the vehicle 10 is unstable (e.g., the vehicle is understeering or oversteering), the drive slip target module 300 may perform steps to reduce the difference between the front axle slip target 360 and the rear axle slip target 365. Conversely, if the vehicle stability indicator module 285 indicates that the vehicle 10 is stable, the axle slip target module 300 may allow a greater difference between the front axle slip target 360 and the rear axle slip target 365. However, the skill and style module 290 also plays a role in determining the front and rear axle slip targets 360 and 365. If the skill and style module 290 indicates that the driver of the vehicle meets or exceeds a certain skill level, and the style signal 350 indicates that a more aggressive style is desired, a relatively greater slip difference between the front and rear axle slip targets 360 and 365 is generated by the axle slip target module 300. Alternatively, if the driver of the vehicle indicates that a less aggressive style is desired (e.g., using the style signal 350), or does not possess a certain skill level, a relatively smaller difference between the front and rear axle slip targets 360 and 365 is generated. In some embodiments, the estimation of the driver's skill can include several different levels (e.g., novice, intermediate, expert), each level allowing a different amount of difference between the front and rear axle slip targets 360 and 365.

The differential wheel slip target module 305 uses the calculations from the skill and style module 290 and the load analysis module 295 to generate a left wheel slip target 370 and a right wheel slip target 375 for either the front axle 130 or the rear axle 134 (step 210), depending on the turning conditions. The differential wheel slip target module 305 also decides how much slip difference is allowed between the left wheel slip target 370 and the right wheel slip target 375. The differential wheel slip target module 305, in some embodiments, bases calculations on how each of the wheels of the vehicle 10 is loaded, the skill level of the driver, and the desired style of the driver. If the load analysis module 295 indicates that the outside wheels (which could be either the left wheels or the right wheels, depending on the direction of the turn direction) of the vehicle 10 are being substantially loaded, and the inside wheels of the vehicle are not being substantially loaded, a relatively large slip difference may be allowed by the differential wheel slip target module 305. For example, the differential wheel slip target module 305 allows a large difference between the left wheel slip target 370 and the right wheel slip target 375 to ensure that the stability of outside wheels is not jeopardized. Alternatively, if the load analysis module indicates that the outside wheels are relatively unloaded, the differential wheel slip target module 305 may allow a relatively smaller difference between the left wheel slip target 370 and the right wheel slip target 375. Similar to the axle slip target module 300, the skill and style module 290 also plays a role in determining left and right wheel slip targets 370 and 375. For example, if the driver skill module 290 indicates that the driver of the vehicle meets or exceeds a certain skill level, and the style signal 350 indicates that a more aggressive style is desired, a relatively smaller slip difference between the left and right wheel slip targets 370 and 375 is generated. For example, on the rear axle 134, a smaller slip difference reduces the lateral capability of the wheels and enhances a sporty feel. Alternatively, if the driver of the vehicle indicates that a less aggressive style is desired (e.g., using the style signal 350), or does not possess a certain skill level, a relatively large slip difference between the left wheel slip target 370 and right wheel slip target 375 is generated, increasing the lateral capability of the wheels.

As previously described, wheel slip and torque are related in that as the torque is increased, the wheel is more prone to slipping. The axle torque calculation module 310 uses the axle slip targets 360 and 365 to generate the target torque values 380 and 385 for each axle 130 and 134, respectively (step 215). In some embodiments, the front axle target torque value 380 differs from the rear target torque value 385, for example, to induce an oversteering condition (as dictated by the stability indicator module 285 and the skill and style module 290).

The differential wheel torque module 315 uses the left wheel slip target 370 and the right wheel slip target 375 from the differential wheel slip target module 305 to calculate a wheel torque difference value 390 (between the left and right wheels). More specifically, the differential wheel torque module 315 determines the maximum torque difference that is allowed to be applied to the left and right wheels for each driven axle. In some embodiments, the wheel torque difference value 390 is limited due to a lack of experience and skill in the driver. In such embodiments, as a result, a substantially similar amount of torque is applied to both the left and right wheels on both the front and rear axles. However, a relatively wide margin or maximum torque difference can be allowed if the wheels are not substantially loaded, or the driver is skilled. In some embodiments, as described below, the wheel torque difference value 390 is combined or superimposed with front axle torque 380 and rear axle torque 385 (from the axle torque calculation module 310), and the result is applied to each individual wheel.

The torque coordination module 320 uses the front and rear axle torque values 380 and 385 and the wheel torque difference value 390 to calculate a plurality of torque actuation signals, and transmits those signals to a variety of components of the vehicle (step 220). The torque coordination module 320 determines an engine torque signal 395, a center coupling torque signal 400, and a braking torque signal 405, which can be used to by each respective component to modulate the torque that is applied to the front and rear axles 130 and 134 of the vehicle 10. In other embodiments, the torque coordination module 330 determines and transmits more or fewer signals than those shown in FIG. 5. For example, in some embodiments, the torque coordination module 320 does not calculate or transmit a signal to the center coupling device 146. In other embodiments, the torque coordination module 320 calculates front and rear differential torque signals that are transmitted to the front and rear differentials 147 and 148 of the vehicle 10.

The way in which torque is coordinated by the torque coordination module 320 and delivered to the vehicle components described above depends on the front and rear axle torque values 380 and 385 and the wheel torque difference value 390. Differing only the front and rear axle torque values 380 and 385 may not lead to a sporty driving experience, because the wheels on the outside of a curve are heavily loaded and able to provide lateral support. However, reducing the differential wheel slip target (using the wheel torque difference value 390) allows more torque to be transferred to the rear wheel on the outside of the curve, which reduces its lateral capability and allows the rear of the vehicle to slide. After determining the amount of torque that is allowed to be applied to the wheels 14 and 18, the appropriate engine torque signal 395 can be transmitted to the engine 138. The center coupling torque signal 400 can be transmitted to the center coupling device 146, which distributes torque to the front and rear axles 130 and 134. Additionally, the braking torque signal 405 can be used by the braking system 150 to modulate the torque at the wheels 14 and 18 according to the front and rear axle torque values 380 and 385 and the wheel torque difference value 390.

In another embodiment, the torque coordination module 320 does not send a center coupling torque signal 400 to the center coupling device 146. In such an embodiment, the distribution of torque between the front and rear wheels 14 and 18 is achieved using only the brakes 150. In yet another embodiment, the torque coordination module generates signals that produce different front and rear axle torque responses, as well as left and right wheel torque responses. In such an embodiment, different amounts of torque are applied to all of the wheels of the vehicle 10, in order to optimize the vehicle response in accordance with the driver's wishes. For example, a different amount of torque is distributed to the front and rear axles 130 and 134 using the center coupling device 146 and the brakes 150 are used to modulate the torque for the left and right wheels. Other torque distribution combinations are possible.

As previously described, the controller 174 (or combination of controllers) can complete the process 200 several times per second. As a result, in some embodiments, modules shown in FIG. 5 generate target slips and their corresponding torque signals several times throughout a vehicle maneuver. For example, the vehicle stability module 285 may indicate that the vehicle 10 is stable prior to entering a turn, which results in the controller 174 allowing a greater difference in the slip (and corresponding torque) between the front and rear axles 130 and 134. However, the vehicle 10 may begin to lose stability as it progresses through the turn, which causes the controller to reduce the difference in slip (and corresponding torque) that is allowed in between the front and rear axles 130 and 134.

Various embodiments are set forth in the following claims.

The invention claimed is:

1. A traction control system comprising:
a controller that generates a first drive slip target, a second drive slip target, and an output signal based on the first and second drive slip targets,
wherein the first and second drive slip targets are generated according to a measured stability status of a vehicle and an estimation of a skill level of the driver of the vehicle,
wherein the output signal is indicative of independent torque quantities to be applied to front and rear axles of the vehicle during turning, and
wherein the controller analyzes loading characteristics of wheels of the vehicle to determine third and fourth drive slip targets, wherein the third and fourth drive slip targets at least partially determine a maximum amount of drive slip that is permitted at the front and rear axles.

2. The traction control system of claim 1, wherein the measured stability status comprises a calculation of an understeering characteristic of the vehicle, an oversteering characteristic of the vehicle, or a combination thereof.

3. The traction control system of claim 2, wherein the measured stability status of the vehicle is calculated using a signal indicative of a steering angle of the vehicle, a signal indicative of a yaw rate of the vehicle, a signal indicative of a lateral acceleration of the vehicle, or a combination thereof.

4. The traction control system of claim 1, wherein the loading characteristics are determined using a signal indicative of a steering angle of the vehicle, a signal indicative of the yaw rate of the vehicle, at least one signal indicative of a wheel speed of the vehicle, or a combination thereof.

5. The traction control system of claim 1, wherein the estimation of the skill level of the driver is based on a signal indicative of a braking force being applied to the wheels of the vehicle, a signal indicative of a steering angle of the vehicle, a signal indicative of an acceleration of the vehicle, a signal indicative of a yaw rate of the vehicle, a signal indicative of a lateral acceleration of the vehicle, or a combination thereof.

6. The traction control system of claim 1, further comprising a desired driving style signal generator, wherein the controller receives a desired driving style signal and generates signals that cause torque that is applied to the front and rear axles of the vehicle to vary from torque that would be applied based on the first and second drive slip targets.

7. The traction control system of claim 1, further comprising a differential, wherein the controller transmits the output signal to the differential, and the differential distributes torque to the front and rear axles.

8. The traction control system of claim 1, further comprising a braking system, wherein the controller transmits the output signal to the braking system, and the braking system individually applies a braking force to each of a front right wheel, a front left wheel, a rear right wheel, and a rear left wheel of the vehicle.

9. A traction control system comprising:
a controller that generates a first drive slip target, a second drive slip target, and an output signal based on the first and second drive slip targets,
wherein the first and second drive slip targets are generated according to a measured stability status of a vehicle and an estimation of a skill level of the driver of the vehicle,
wherein the first drive slip target indicates a first non-zero amount of slip that at least a first wheel of the vehicle is allowed with respect to a driving surface, and the second drive slip target indicates a second non-zero amount of slip that at least a second wheel of the vehicle is allowed with respect to the driving surface,
wherein the output signal is indicative of independent torque quantities to be applied to front and rear axles of the vehicle during turning, and
wherein the estimation of the skill level of the driver is based on a signal indicative of a braking force being applied to the wheels of the vehicle, a signal indicative of a steering angle of the vehicle, a signal indicative of an acceleration of the vehicle, a signal indicative of a yaw rate of the vehicle, a signal indicative of a lateral acceleration of the vehicle, or a combination thereof.

10. The traction control system of claim 9, wherein the measured stability status comprises a calculation of an understeering characteristic of the vehicle, an oversteering characteristic of the vehicle, or a combination thereof.

11. The traction control system of claim 10, wherein the measured stability status of the vehicle is calculated using a signal indicative of a steering angle of the vehicle, a signal indicative of a yaw rate of the vehicle, a signal indicative of a lateral acceleration of the vehicle, or a combination thereof.

12. The traction control system of claim 9, wherein the controller analyzes loading characteristics of wheels of the vehicle to determine third and fourth drive slip targets, wherein the third and fourth drive slip targets at least partially determine a maximum amount of drive slip that is permitted at the front and rear axles.

13. The traction control system of claim 12, wherein the loading characteristics are determined using a signal indicative of a steering angle of the vehicle, a signal indicative of the yaw rate of the vehicle, at least one signal indicative of a wheel speed of the vehicle, or a combination thereof.

14. The traction control system of claim 9, further comprising a desired driving style signal generator, wherein the controller receives a desired driving style signal and generates signals that cause torque that is applied to the front and rear axles of the vehicle to vary from torque that would be applied based on the first and second drive slip targets.

15. The traction control system of claim 9, further comprising a differential, wherein the controller transmits the output signal to the differential, and the differential distributes torque to the front and rear axles.

16. The traction control system of claim 9, further comprising a braking system, wherein the controller transmits the output signal to the braking system, and the braking system individually applies a braking force to each of a front right wheel, a front left wheel, a rear right wheel, and a rear left wheel of the vehicle.

17. The traction control system of claim 9, wherein the first and second drive slip targets are not equal.

18. A traction control system comprising:
a controller that generates a first drive slip target, a second drive slip target, and an output signal based on the first and second drive slip targets, and
a desired driving style signal generator,
wherein the first and second drive slip targets are generated according to a measured stability status of a vehicle and an estimation of a skill level of the driver of the vehicle,
wherein the first drive slip target indicates a first non-zero amount of slip that at least a first wheel of the vehicle is allowed with respect to a driving surface, and the second drive slip target indicates a second non-zero amount of slip that at least a second wheel of the vehicle is allowed with respect to the driving surface,
wherein the output signal is indicative of independent torque quantities to be applied to front and rear axles of the vehicle during turning, and
wherein the controller receives a desired driving style signal from the desired driving style signal generator and generates signals that cause torque that is applied to the front and rear axles of the vehicle to vary from torque that would be applied based on the first and second drive slip targets.

19. The traction control system of claim 18, wherein the measured stability status comprises a calculation of an understeering characteristic of the vehicle, an oversteering characteristic of the vehicle, or a combination thereof.

20. The traction control system of claim 19, wherein the measured stability status of the vehicle is calculated using a signal indicative of a steering angle of the vehicle, a signal indicative of a yaw rate of the vehicle, a signal indicative of a lateral acceleration of the vehicle, or a combination thereof.

21. The traction control system of claim 18, wherein the controller analyzes loading characteristics of wheels of the vehicle to determine third and fourth drive slip targets, wherein the third and fourth drive slip targets at least partially determine a maximum amount of drive slip that is permitted at the front and rear axles.

22. The traction control system of claim 21, wherein the loading characteristics are determined using a signal indicative of a steering angle of the vehicle, a signal indicative of the yaw rate of the vehicle, at least one signal indicative of a wheel speed of the vehicle, or a combination thereof.

23. The traction control system of claim 18, wherein the estimation of the skill level of the driver is based on a signal indicative of a braking force being applied to the wheels of the vehicle, a signal indicative of a steering angle of the vehicle, a signal indicative of an acceleration of the vehicle, a signal indicative of a yaw rate of the vehicle, a signal indicative of a lateral acceleration of the vehicle, or a combination thereof.

24. The traction control system of claim 18, further comprising a differential, wherein the controller transmits the output signal to the differential, and the differential distributes torque to the front and rear axles.

25. The traction control system of claim 18, further comprising a braking system, wherein the controller transmits the output signal to the braking system, and the braking system individually applies a braking force to each of a front right wheel, a front left wheel, a rear right wheel, and a rear left wheel of the vehicle.

26. The traction control system of claim 18, wherein the first and second drive sup targets are not equal.

* * * * *

UNITED STATES PATENT AND TRADEMARK OFFICE
CERTIFICATE OF CORRECTION

| | | |
|---|---|---|
| PATENT NO. | : 7,641,014 B2 | Page 1 of 1 |
| APPLICATION NO. | : 11/344294 | |
| DATED | : January 5, 2010 | |
| INVENTOR(S) | : Jiamu Hu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 873 days.

Signed and Sealed this

Sixteenth Day of November, 2010

David J. Kappos
*Director of the United States Patent and Trademark Office*